No. 662,279.   J. B. LINDSEY.   Patented Nov. 20, 1900.
ANIMAL TRAP.
(Application filed Sept. 25, 1900.)
(No Model.)
Fig. 1.
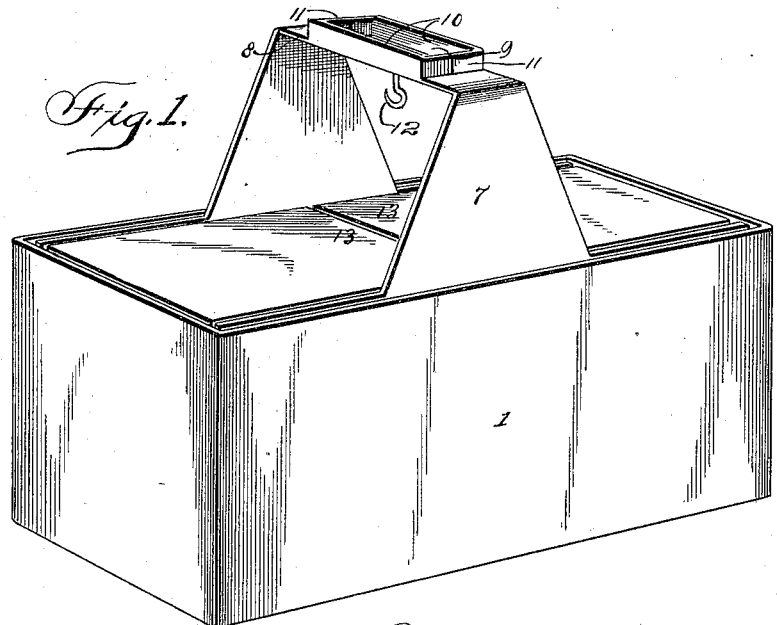
Fig. 2.
Fig. 3.
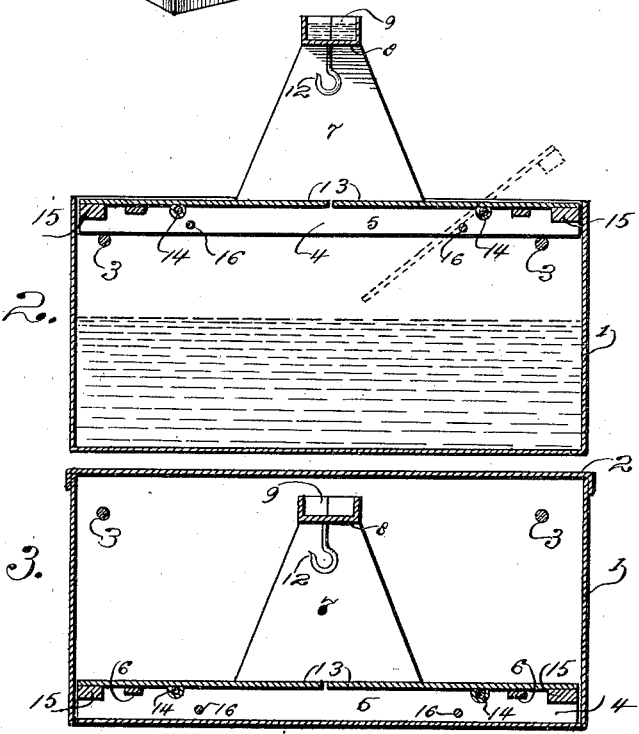
Witnesses
Fred E. Maynard
H. H. Riley
By C. A. Snow & Co.
Attorneys
J. B. Lindsey, Inventor

UNITED STATES PATENT OFFICE.

JAMES B. LINDSEY, OF CHESTER, SOUTH CAROLINA, ASSIGNOR OF ONE-HALF TO D. EARL COLVIN, OF SAME PLACE.

ANIMAL-TRAP.

SPECIFICATION forming part of Letters Patent No. 662,279, dated November 20, 1900.

Application filed September 25, 1900. Serial No. 31,060. (No model.)

*To all whom it may concern:*

Be it known that I, JAMES B. LINDSEY, a citizen of the United States, residing at Chester, in the county of Chester and State of South Carolina, have invented a new and useful Animal-Trap, of which the following is a specification.

The invention relates to improvements in animal-traps.

One object of the present invention is to improve the construction of animal-traps and to provide a simple, inexpensive, and efficient one designed especially for destroying rats and mice and adapted to reset itself automatically and capable of effectually preventing the animals from getting the bait, so that the latter will not have to be continually renewed.

A further object of the invention is to provide a trap of this character in which the receptacle for the captured animals will also serve to house the trap mechanism when the trap is not in use.

The invention consists in the construction and novel combination and arrangement of parts hereinafter fully described, illustrated in the accompanying drawings, and pointed out in the claims hereto appended.

In the drawings, Figure 1 is a perspective view of an animal-trap constructed in accordance with this invention and arranged for use. Fig. 2 is a longitudinal sectional view of the same. Fig. 3 is a longitudinal sectional view, the trap mechanism being arranged within the receptacle.

Like numerals of reference designate corresponding parts in the several figures of the drawings.

1 designates a receptacle rectangular in cross-section, designed to be constructed of sheet metal or other suitable material and adapted to form a receptacle for the captured animals and also for the trap mechanism hereinafter explained to enable such mechanism to be arranged out of the way and to be protected, and also to permit the trap to be compactly arranged for shipping and storing. The receptacle, which is provided with a cover 2, has a pair of transverse supporting-rods 3 located adjacent to its ends and disposed a short distance below its upper edges to provide a space for a rectangular frame 4, so that the latter will be flush with the upper edges of the receptacle when the parts are arranged for use, as shown in Figs. 1 and 2. The cover is designed to be placed on the receptacle, as indicated in Fig. 3 of the drawing, when the rectangular frame and the parts carried by the same are housed within the receptacle. The rectangular frame is composed of longitudinal side bars 5 and connecting cross-bars 6, and the said side bars 5 are provided with central vertical extensions 7, forming side supports, and connected by a top piece 8. The side extensions are approximately triangular, being preferably tapered toward their upper ends, as clearly shown in Fig. 1, and they are also preferably formed of sheet metal. The top cross-piece 8, which is also formed of sheet metal, is integral with the sides 7 and is provided at its top or upper face with a trough 9, designed to contain water and preferably constructed of sheet metal. The side walls 10 of the trough are preferably formed integral with the connecting top piece 8, and consist of upturned flanges which are connected by the end walls 11, also preferably formed integral with the side flanges, and consisting of extensions thereof. The sheet metal at the side edges of the connecting top piece may be bent upward to form side flanges, and the end portions thereof may be severed from the top piece 8 and bent transversely thereof to form the end walls.

The trough is designed to contain water, and a suitable solid bait of cheese or other material may be suspended beneath the trough by a bait-holder 12, consisting of a hook, and the bait is located over the inner ends of a pair of tilting trap-doors 13, hinged between their ends at 14 by any suitable means and provided at their outer ends with suitable weights 15, adapted to return the trap-doors to a horizontal position for resetting the trap after an animal has been captured. The outer portions of the trap-doors are supported upon the transverse connecting-bars 6, and they form a solid platform for the animals in approaching the bait; but as soon as the animal, attracted by the bait, passes beyond the point of hinging the trap-door the latter will be tilted and will precipitate the animal into the receptacle. Any attempt of the animal to escape will be by jumping forward; but as the inner portion of the opposite trap-door is adapted to tilt it will be absolutely impossible for the animal to escape. The receptacle is designed to contain about three inches of water, which will be sufficient to drown the captured animals.

It will be seen that the trap is exceedingly simple and inexpensive in construction, that it is strong and durable and not liable to get out of order, and that it is positive and reliable in operation and capable of automatically resetting itself after each operation. It will also be apparent that its great simplicity will avoid exciting any suspicion of it in the animals to be destroyed and that the clear passage-way between the supports will also serve to remove any distrust and that the water-trough is a great advantage and will often attract animals when other bait will not.

The rectangular frame and the parts carried thereby constitute the trap mechanism and may be readily removed by tilting the rectangular frame, so that its upper end will clear the adjacent rod 3, and it is arranged in substantially the same position in placing it in the receptacle. The downward swing of the inner portions of the tilting trap-doors are preferably limited by suitable stops 16, preferably formed by transverse rods, secured at their ends to the side bars of the rectangular frame.

What is claimed is—

1. A device of the class described comprising a receptacle designed to be provided with a cover and having supporting-rods located near its top, the rectangular frame adapted to be placed within the receptacle and arranged upon the transverse rods and provided with upwardly-extending supports located at opposite sides of the frame, a top piece connecting the supports and provided at the top with a trough and having a depending bait-holder located beneath the trough, and the tilting trap-doors having weighted outer portions, substantially as and for the purpose described.

2. A device of the class described comprising a receptacle designed to be provided with a cover and having upper supporting-rods, a rectangular frame adapted to be arranged either upon the supporting-rods or within the receptacle and provided at opposite sides with supports, the top bar connecting the supports and provided with a water-trough consisting of side and end walls formed integral with the top piece, the side walls being formed by side flanges and the end walls consisting of extensions thereof, severed at their lower edges from the top piece and bent transversely thereof, and the tilting trap-doors mounted within the frame, substantially as described.

In testimony that I claim the foregoing as my own I have hereto affixed my signature in the presence of two witnesses.

JAMES B. LINDSEY.

Witnesses:
JAMES YOUNG,
SAML. E. MCFADDEN.